(12) United States Patent
Choi et al.

(10) Patent No.: US 12,374,499 B2
(45) Date of Patent: Jul. 29, 2025

(54) MULTILAYER ELECTRONIC COMPONENT

(71) Applicant: SAMSUNG ELECTRO-MECHANICS CO., LTD., Suwon-si (KR)

(72) Inventors: Ho Sam Choi, Suwon-si (KR); Kyu Jeong Sim, Suwon-si (KR); Hyo Sung Choi, Suwon-si (KR); Jung Jin Park, Suwon-si (KR); Jong Ho Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 260 days.

(21) Appl. No.: 18/198,533

(22) Filed: May 17, 2023

(65) Prior Publication Data
US 2024/0194410 A1  Jun. 13, 2024

(30) Foreign Application Priority Data
Dec. 12, 2022 (KR) .................. 10-2022-0172233

(51) Int. Cl.
*H01G 4/30* (2006.01)
*C04B 35/626* (2006.01)
(Continued)

(52) U.S. Cl.
CPC ........... *H01G 4/30* (2013.01); *C04B 35/6262* (2013.01); *C04B 35/64* (2013.01); *H01G 4/008* (2013.01);
(Continued)

(58) Field of Classification Search
CPC .... H01G 4/008; H01G 4/1209; H01G 4/1227; H01G 4/1236; H01G 4/30
See application file for complete search history.

(56) References Cited

U.S. PATENT DOCUMENTS

2011/0118104 A1* 5/2011 Hashimoto ............. H01G 4/30
501/138
2014/0078642 A1 3/2014 Shinichi
(Continued)

FOREIGN PATENT DOCUMENTS

JP 2014-232850 A 12/2014
JP 2016-117605 A 6/2016
(Continued)

OTHER PUBLICATIONS

Extended European Search Report issued in corresponding European Patent Application No. 23176996.9 dated Dec. 11, 2023.

*Primary Examiner* — Nathan Milakovich
(74) *Attorney, Agent, or Firm* — MORGAN, LEWIS & BOCKIUS LLP

(57) ABSTRACT

A multilayer electronic component includes a body including a dielectric layer and internal electrodes alternately disposed with the dielectric layer in a first direction, and a cover portion disposed on end surfaces of the capacitance forming portion; and an external electrode disposed on the body, wherein a ratio of an average content of zirconium (Zr) included in the capacitance forming portion to an average content of zirconium (Zr) included in the cover portion satisfies 0.55 or more and 1.00 or less, wherein an average content of zirconium (Zr) included in the capacitance forming portion satisfies 1073 ppm or more and 1950 ppm or less, and wherein an average size of the dielectric grains included in a central region of the capacitance forming portion is 200 nm or more and 300 nm or less, and a standard deviation for a size is 100 nm or more and 130 nm or less.

20 Claims, 6 Drawing Sheets

(51) Int. Cl.
    *C04B 35/64*         (2006.01)
    *H01G 4/008*       (2006.01)
    *H01G 4/012*       (2006.01)
    *H01G 4/12*         (2006.01)
    *H01G 4/224*       (2006.01)

(52) U.S. Cl.
    CPC ........... *H01G 4/012* (2013.01); *H01G 4/1227* (2013.01); *H01G 4/224* (2013.01)

(56) References Cited

U.S. PATENT DOCUMENTS

| | | |
|---|---|---|
| 2021/0159014 A1 | 5/2021 | Kowase |
| 2022/0139623 A1 | 5/2022 | Park |
| 2022/0139625 A1 | 5/2022 | Lee et al. |
| 2022/0157530 A1 | 5/2022 | Kim et al. |
| 2022/0181082 A1* | 6/2022 | Ham .................. H01G 4/30 |
| 2024/0062963 A1* | 2/2024 | Lee .................... H01G 4/1236 |

FOREIGN PATENT DOCUMENTS

| | | |
|---|---|---|
| KR | 10-2014-0007942 A | 1/2014 |
| KR | 10-2022-0059150 A | 5/2022 |
| KR | 10-2022-0067994 A | 5/2022 |

\* cited by examiner

MULTILAYER ELECTRONIC COMPONENT

CROSS-REFERENCE TO RELATED APPLICATION (S)

This application claims benefit of priority to Korean Patent Application No. 10-2022-0172233 filed on Dec. 12, 2022 in the Korean Intellectual Property Office, the disclosure of which is incorporated herein by reference in its entirety.

BACKGROUND

1. Technical Field

The present disclosure relates to a multilayer electronic component.

2. Description of Related Art

A multilayer electronic component (MLCC), a multilayer electronic component, may be a chip-type condenser mounted on the printed circuit boards of various electronic products such as imaging devices including a liquid crystal display (LCD) and a plasma display panel (PDP), a computer, a smartphone, and a mobile phone and charging or discharging electricity.

Such a multilayer ceramic capacitor may be used as a component of various electronic devices as a multilayer ceramic capacitor may have a small size and high capacitance thereof and may be easily mounted. As various electronic devices such as computers and mobile devices have been miniaturized and implemented with high-output, demand for miniaturization and high capacitance multilayer ceramic capacitors has been increased.

To disperse particles included in dielectric slurry used in a multilayer ceramic capacitor, zirconia beads may be used as a medium for dispersion, and by breaking up the aggregation/agglomeration of dielectric particles by dispersion, a specific surface area and grain growth may be improved. When a particle size of dielectric particles included in the dielectric slurry is non-uniform, dispersion of dielectric grains during firing may occur, and the size of dielectric grains may become non-uniform, which may cause a short circuit of the multilayer ceramic capacitor or a decrease in breakdown voltage (BDV).

More specifically, when preparing dielectric powder, a drying process may be involved. In this case, a phenomenon in which necking of dielectric particles is performed, that is, dry agglomeration may occur. To address dry agglomeration of the dielectric powder and to secure a target specific surface area, dispersion may be performed using zirconia beads. Accordingly, a side effect of non-uniform particle size distribution of dielectric particles in the dielectric slurry and an increase in dielectric grain distribution after firing may occur.

Also, due to wear of zirconia beads, zirconium (Zr) components may enter dielectric slurry in the form of impurities, which may slow grain boundary mobility during dielectric firing, thereby preventing grain growth. Also, in the case of zirconium (Zr), zirconium may be solid solute in a Ti site during firing and may promote sintering, but when zirconium (Zr) is excessively added, not dissolved zirconium (Zr) may prevent the grain growth of dielectric grains.

When the added zirconium (Zr) component is constant, firing may be controlled, but the amount of wear of the zirconia beads in the dispersion device may not be constant, which may cause dispersion of dielectric grains during a firing process, and additionally, as the dispersion time increases, the inflow of zirconium (Zr) may increase, and side effects may become severe. Accordingly, it may be important to control the inflow of zirconium (Zr) impurities.

SUMMARY

An example embodiment of the present disclosure is to address size distribution of dielectric grains by controlling the content of zirconium (Zr).

An example embodiment of the present disclosure is to, by controlling a size of dielectric particles to be fine and uniform, form dielectric grains to have a fine and uniform size so as to prevent an electric field concentration and a decrease in breakdown voltage (BDV).

According to an example embodiment of the present disclosure, a multilayer electronic component includes a body including a capacitance forming portion including a dielectric layer and internal electrodes alternately disposed with the dielectric layer in a first direction, and a cover portion disposed on each of both end surfaces of the capacitance forming portion in the first direction; and an external electrode disposed on the body, wherein a ratio of an average content of zirconium (Zr) included in the capacitance forming portion to an average content of zirconium (Zr) included in the cover portion satisfies 0.55 or more and 1.00 or less, wherein an average content of zirconium (Zr) included in the capacitance forming portion satisfies 1073 ppm or more and 1950 ppm or less, and wherein an average size of dielectric grains included in a central region of the capacitance forming portion is 200 nm or more and 300 nm or less with a standard deviation that is 100 nm or more and 130 nm or less.

BRIEF DESCRIPTION OF DRAWINGS

The above and other aspects, features, and advantages of the present disclosure will be more clearly understood from the following detailed description, taken in combination with the accompanying drawings, in which.

DETAILED DESCRIPTION

Figure 1:
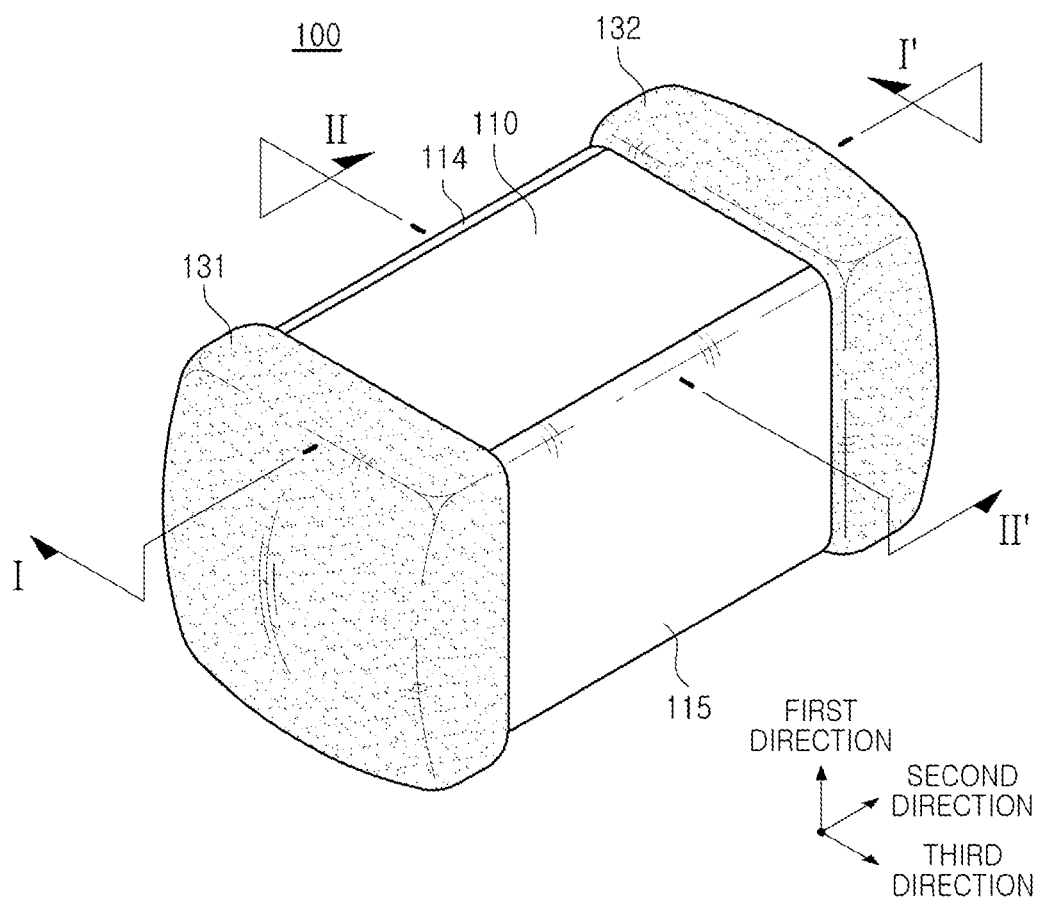
FIG. 1 is a perspective diagram illustrating a multilayer electronic component according to an example embodiment of the present disclosure.

Hereinafter, embodiments of the present disclosure will be described as below with reference to the accompanying drawings.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application.

In the drawings, same elements will be indicated by same reference numerals. Also, redundant descriptions and detailed descriptions of known functions and elements which may unnecessarily make the gist of the present disclosure obscure will not be provided. In the accompanying drawings, some elements may be exaggerated, omitted or briefly illustrated, and the sizes of the elements do not necessarily reflect the actual sizes of these elements. The terms, "include," "comprise," "is configured to," or the like of the description are used to indicate the presence of features, numbers, steps, operations, elements, portions or combination thereof, and do not exclude the possibilities of combination or addition of one or more features, numbers, steps, operations, elements, portions or combination thereof.

In the drawings, a first direction may be defined as a lamination direction or a thickness T direction, a second direction may be defined as a length L direction, and a third direction may be defined as a width W direction.

Multilayer Electronic Component

FIG. 1 is a perspective diagram illustrating a multilayer electronic component according to an example embodiment.

Figure 2:
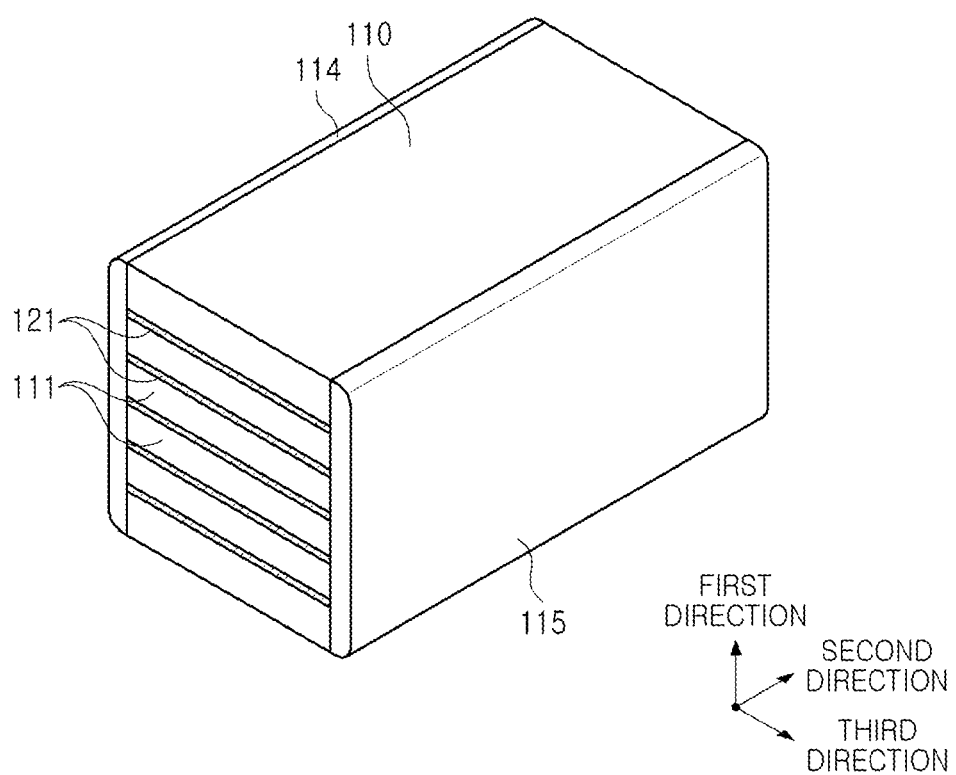
FIG. 2 is a diagram illustrating exteriors of the side margin portion and the body in FIG. 1.

FIG. 2 is a diagram illustrating exteriors of a side margin portion and a body in FIG. 1.

Figure 3:
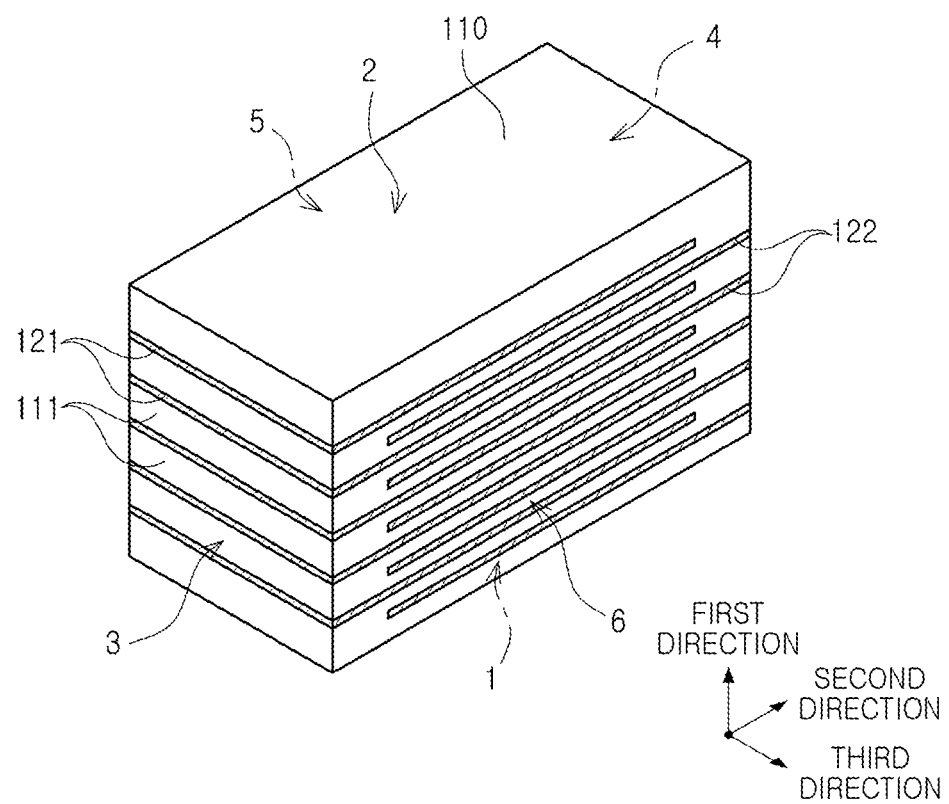
FIG. 3 is a diagram illustrating an exterior of the body in FIG. 2.

FIG. 3 is a diagram illustrating an exterior of a body in FIG. 2.

Figure 4:
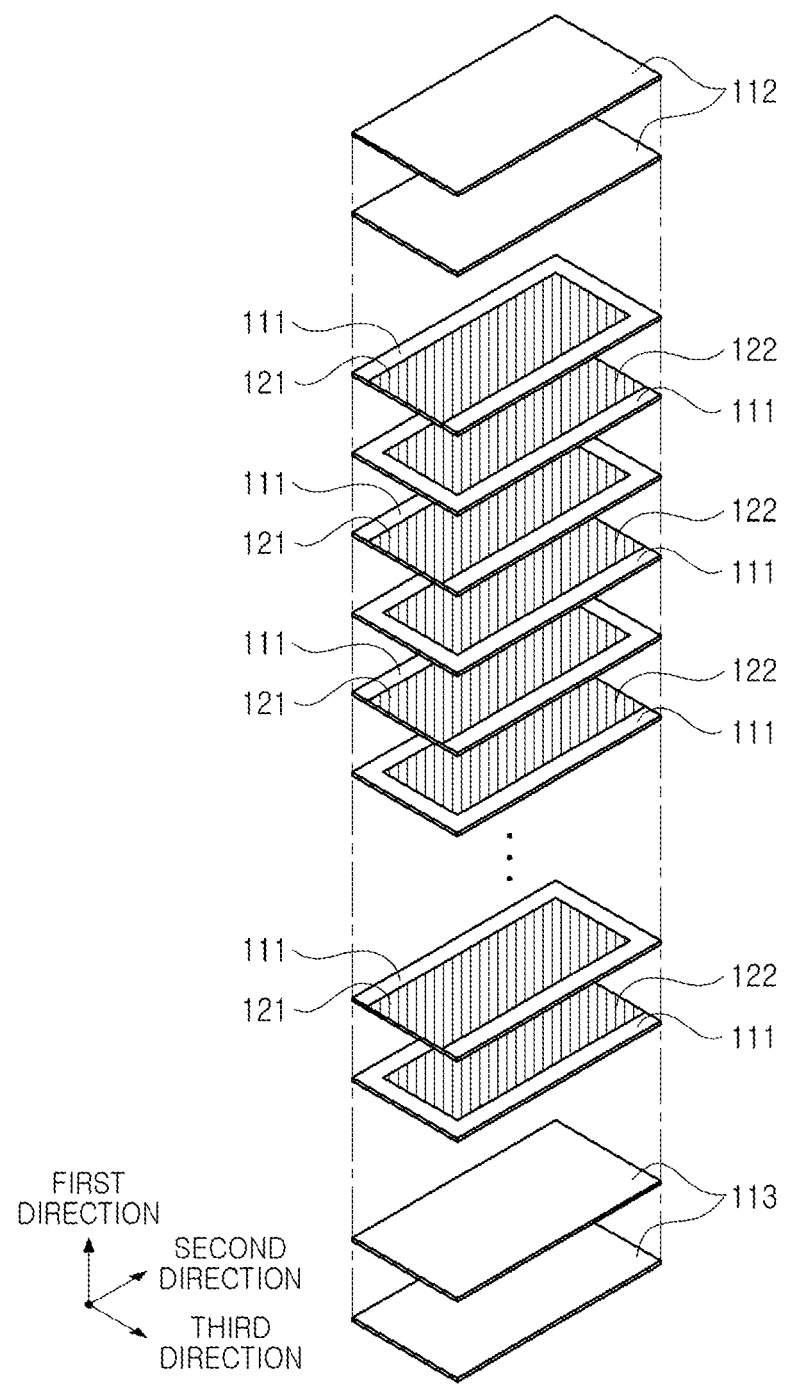
FIG. 4 is an exploded perspective diagram illustrating the laminate structure of an internal electrode in FIG. 2.

FIG. 4 is an exploded perspective diagram illustrating a laminate structure of an internal electrode in FIG. 2.

Figure 5:
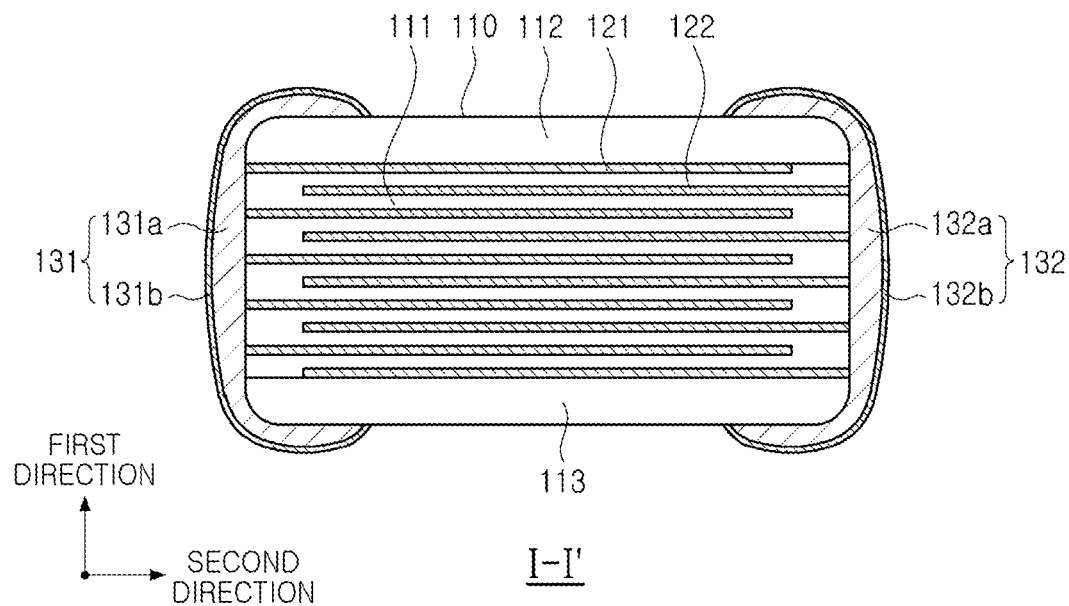
FIG. 5 is a cross-sectional diagram taken along line I-I' in FIG. 1.

FIG. 5 is a cross-sectional diagram taken along line I-I' in FIG. 1.

Figure 6:
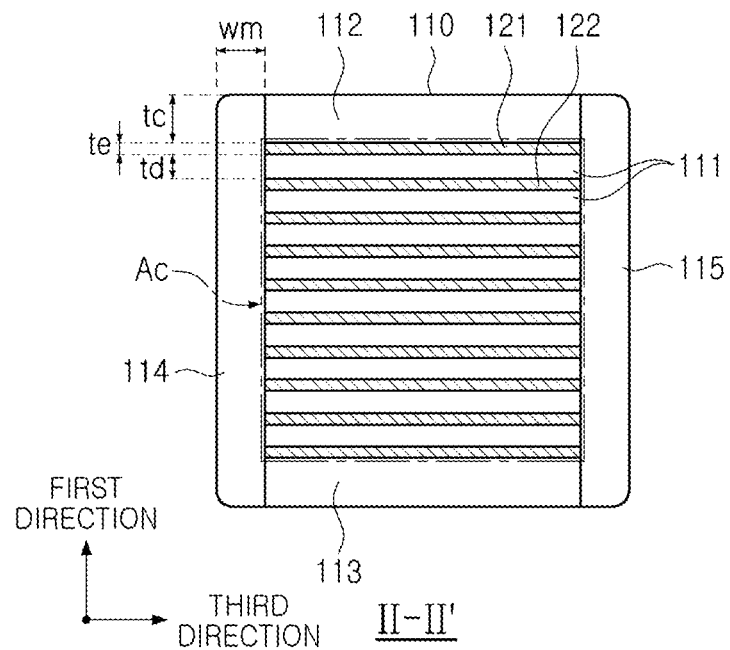
FIG. 6 is a cross-sectional diagram taken along line II-II' in FIG. 1.

FIG. 6 is a cross-sectional diagram taken along line II-II' in FIG. 1.

Figure 7:
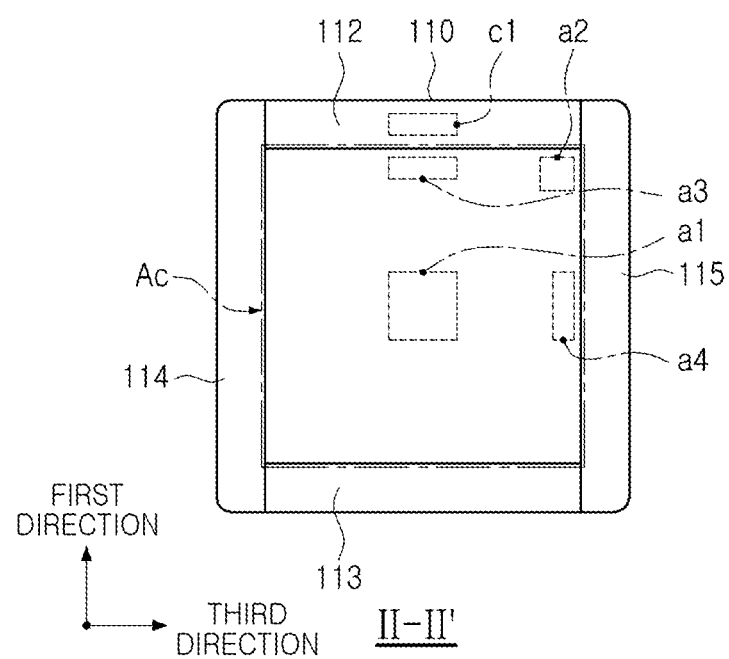
FIG. 7 is a cross-sectional diagram illustrating a portion other than the internal electrode in FIG. 6.

FIG. 7 is a cross-sectional diagram illustrating a portion other than an internal electrode in FIG. 6.

Hereinafter, a multilayer electronic component according to an example embodiment will be described in greater detail with reference to FIGS. 1 to 7. A multilayer ceramic capacitor will be described as an example of a multilayer electronic component, but the example embodiment may also be applied to various electronic products using a dielectric composition, such as an inductor, a piezoelectric element, a varistor, or a thermistor.

A multilayer electronic component 100 may include a body including a capacitance forming portion Ac including a dielectric layer 111 and internal electrodes 121 and 122 alternately disposed with the dielectric layer 111 in a first direction, and cover portions 112 and 113 disposed on both end surfaces of the capacitance forming portion Ac in the first direction, respectively; and external electrodes 131 and 132 disposed on the body 110, a ratio of the average content of zirconium (Zr) included in the capacitance forming portion Ac to the average content of zirconium (Zr) included in the cover portion 112 and 113 may satisfy 0.55 or more and 1.00 or less, the average content of zirconium (Zr) included in the capacitance forming portion Ac may satisfy 1073 ppm or more and 1950 ppm or less, and the average size of the dielectric grains included in the central region a1 of the capacitance forming portion Ac may be 200 nm or more and 300 nm or less, and a standard deviation of the size may be 100 nm or more and 130 nm or less.

In the body 110, the dielectric layers 111 and internal electrodes 121 and 122 may be alternately laminated.

More specifically, the body 110 may include a capacitance forming portion Ac disposed in the body 110 and forming capacitance including first internal electrodes 121 and second internal electrodes 122 alternately disposed to face each other with the dielectric layer 111 interposed therebetween.

The shape of the body 110 may not be limited to any particular shape, but as illustrated, the body 110 may have a hexahedral shape or a shape similar to a hexahedral shape. Due to reduction of ceramic powder included in the body 110 during a firing process, the body 110 may not have an exact hexahedral shape formed by linear lines but may have a substantially hexahedral shape.

The body 110 may have first and second surfaces 1 and 2 opposing each other in the first direction, third and fourth surfaces 3 and 4 connected to the first and second surfaces 1 and 2 and opposing in the second direction, and fifth and sixth surfaces 5 and 6 connected to the first and second surfaces 1 and 2 and the third and fourth surfaces 3 and 4 and opposing each other in the third direction.

The plurality of dielectric layers 111 forming the body 110 may be in a fired state, and a boundary between the adjacent dielectric layers 111 may be integrated with each other such that the boundary may not be distinct without using a scanning electron microscope (SEM).

A raw material for forming the dielectric layer 111 is not limited to any particular example as long as sufficient capacitance may be obtained. For example, a barium titanate-based material, a lead composite perovskite-based material, or a strontium titanate-based material may be used. The barium titanate material may include $BaTiO_3$ ceramic powder, and an example of the ceramic powder may include $(Ba_{1-x}Ca_x)TiO_3$ ($0<x<1$), $Ba(Ti_{1-y}Ca_y)O_3$ ($0<y<1$), $(Ba_{1-x}Ca_x)(Ti_{1-y}Zr_y)O_3$ ($0<x<1, 0<y<1$) or $Ba(Ti_{1-y}Zr_y)O_3$ ($0<y<1$) in which Ca (calcium), Zr (zirconium) is partially solid-solute.

Also, various ceramic additives, organic solvents, binders, dispersants, or the like, may be added to a raw material for forming the dielectric layer 111 in the example embodiment to powder such as barium titanate ($BaTiO_3$).

In this case, the content of zirconium (Zr) included in the capacitance forming portion Ac may be an input content due to zirconia beads having undergone two stages of milling to be described later. However, an example embodiment thereof is not limited thereto, and the content may be by adding an additive including a zirconium (Zr) element.

A thickness td of the dielectric layer 111 may not be limited to any particular example.

However, to easily implement a reduced size and high capacitance of the multilayer electronic component 100, the thickness td of the dielectric layer 111 may be 0.6 μm or less, and more preferably, 0.4 μm or less.

Here, the thickness td of the dielectric layer 111 may refer to an average thickness of the dielectric layer 111 disposed between the first and second internal electrodes 121 and 122.

The thickness td of the dielectric layer 111 may refer to the size of the dielectric layer 111 in the first direction. Also, the thickness td of the dielectric layer 111 may refer to the average thickness td of the dielectric layer 111 and may refer to the average size of the dielectric layer 111 in the first direction.

The average thickness of the dielectric layer 111 may be measured by scanning a cross-section of the body 110 in the first and second directions using a scanning electron microscope (SEM) with a magnification of 10,000. More specifically, an average value may be measured from the thicknesses of the dielectric layer 111 at 30 points spaced apart by an equal distance in the first direction in the scanned image.

The average value measured as above may refer to an average size of one dielectric layer 111 in the first direction. The 30 points at equal distances may be designated in the active portion Ac. Also, when the average value is measured by extending the measurement of the average value to ten dielectric layers 111, the average thickness of the dielectric layer 111 in the first direction may be further generalized. Other methods and/or tools appreciated by one of ordinary skill in the art, even if not described in the present disclosure, may also be used.

The internal electrodes 121 and 122 may be alternately laminated with the dielectric layer 111.

The internal electrodes 121 and 122 may include a first internal electrode 121 and a second internal electrode 122, the first and second internal electrodes 121 and 122 may be alternately disposed to face each other with the dielectric layer 111 included in the body 110 interposed therebetween, and may be exposed to the third and fourth surfaces 3 and 4 of the body 110, respectively.

More specifically, the first internal electrode 121 may be spaced apart from the fourth surface 4 and may be exposed through the third surface 3, and the second internal electrode 122 may be spaced apart from the third surface 3 and may be exposed through the fourth surface 4. The first external electrode 131 may be disposed on the third surface 3 of the body 110 and may be connected to the first internal electrode 121, and the second external electrode 132 may be disposed on the fourth surface 4 of the body 110 and may be connected to the second internal electrode 122.

That is, the first internal electrode 121 may be connected to the first external electrode 131 without being connected to the second external electrode 132, and the second internal electrode 122 may be connected to the second external electrode 132 without being connected to the first external electrode 131. In this case, the first and second internal electrodes 121 and 122 may be electrically separated from each other by the dielectric layer 111 disposed therebetween.

The body 110 may be formed by alternately laminating ceramic green sheets on which the first internal electrodes 121 are printed and ceramic green sheets on which the second internal electrodes 122 are printed, and firing the sheets.

The material for forming the internal electrodes 121 and 122 is not limited to any particular example, and a material having excellent electrical conductivity may be used. For example, the internal electrodes 121 and 122 may include one or more of nickel (Ni), copper (Cu), palladium (Pd), silver (Ag), gold (Au), platinum (Pt), tin (Sn), tungsten (W), titanium (Ti), and alloys thereof.

Also, the internal electrodes 121 and 122 may be formed by printing conductive paste for internal electrodes including one or more of nickel (Ni), copper (Cu), palladium (Pd), silver (Ag), gold (Au), platinum (Pt), tin (Sn), tungsten (W), titanium (Ti), and alloys thereof on a ceramic green sheet. A screen printing method or a gravure printing method may be used as a method of printing the conductive paste for internal electrodes, but an example embodiment thereof is not limited thereto.

The thickness te of the internal electrodes 121 and 122 may not need to be limited to any particular example.

However, to easily implement miniaturization and high capacitance of the multilayer electronic component 100, the thickness te of the internal electrodes 121 and 122 may be 0.6 µm or less, and more preferably, 0.4 µm or less.

Here, the thickness te of the internal electrodes 121 and 122 may refer to the size of the internal electrodes 121 and 122 in the first direction. Also, the thickness te of the internal electrodes 121 and 122 may refer to the average thickness te of the internal electrodes 121 and 122, and may refer to the average size of the internal electrodes 121 and 122 in the first direction.

The average thickness of the internal electrodes 121 and 122 may be measured by scanning a cross-section of the body 110 in the first and second directions using a scanning electron microscope (SEM) with a magnification of 10,000. More specifically, an average value may be measured from the thicknesses of the internal electrodes 121 and 122 at 30 points spaced apart by an equal distance in the first direction in the scanned image. The average value measured as above may refer to an average size of one internal electrodes 121 and 122 in the first direction. The 30 points at equal distances may be designated in the active portion Ac. Also, when the average value is measured by extending the measurement of the average value to ten internal electrodes 121 and 122, the average thickness of the internal electrodes 121 and 122 in the first direction may be further generalized. Other methods and/or tools appreciated by one of ordinary skill in the art, even if not described in the present disclosure, may also be used.

The body 110 may include cover portions 112 and 113 disposed on both end-surfaces of the capacitance forming portion Ac in the first direction.

More specifically, the body 110 may include an upper cover portion 112 disposed above the capacitance forming portion Ac in the first direction and a lower cover portion 113 disposed below the capacitance forming portion Ac in the first direction.

The upper cover portion 112 and the lower cover portion 113 may be formed by laminating a single dielectric layer 111 or two or more dielectric layers 111 on the upper and lower surfaces of the capacitance forming portion Ac in a first direction, respectively, and may basically prevent damages to the internal electrodes 121 and 122 due to physical or chemical stress.

The upper cover portion 112 and the lower cover portion 113 may not include the internal electrodes 121 and 122 and may include the same material as that of the dielectric layer 111. That is, the upper cover portion 112 and the lower cover portion 113 may include a ceramic material, for example, a barium titanate ($BaTiO_3$) ceramic material.

In this case, the content of zirconium (Zr) included in the cover portion 112 and 113 may be an input content due to zirconia beads having undergone two stages of milling to be described later. However, an example embodiment thereof is not limited thereto, and the content may be provided by adding an additive including a zirconium (Zr) element.

The thickness tc of the cover portion 112 and 113 may not need to be limited to any particular example.

However, to easily obtain miniaturization and high capacitance of multilayer electronic components, the thickness tc of the cover portions 112 and 113 may be 100 µm or less, preferably 30 µm or less. More preferably, the thickness may be 20 µm or less.

Here, the thickness tc of the cover portion 112 or 113 may refer to the size of the cover portion 112 or 113 in the first direction. Also, the thickness tc of the cover portions 112 and 113 may refer to the average thickness tc of the cover portions 112 and 113, and may refer to the average size of the cover portions 112 and 113 in the first direction.

The average thickness of the cover portions 112 and 113 may be measured by scanning a cross-section of the body 110 in the first and second directions using a scanning electron microscope (SEM) with a magnification of 10,000×. More specifically, an average value may be measured from the thicknesses of the cover portion at 30 points spaced apart by an equal distance in the first direction in the scanned image. Other methods and/or tools appreciated by one of ordinary skill in the art, even if not described in the present disclosure, may also be used.

Meanwhile, side margin portions 114 and 115 may be disposed on both end-surfaces of the body 110 in the third direction.

More specifically, the side margin portions 114 and 115 may include a first side margin portion 114 disposed on the fifth surface 5 and a second side margin portion 115 disposed on the sixth surface 6 of the body 110. That is, the side margin portions 114 and 115 may be disposed on both end-surfaces of the body 110 in the third direction.

As illustrated, the side margin portions 114 and 115 may refer to a region between both ends of the first and second internal electrodes 121 and 122 in the third direction and the boundary surface of the body 110 with respect to the cross-section of the body 110 in the second and third directions.

The side margin portions 114 and 115 may basically prevent damages to the internal electrodes 121 and 122 due to physical or chemical stress.

The side margin portions 114 and 115 may be formed by forming internal electrodes 121 and 122 on the ceramic green sheet by applying a conductive paste other than the region in which the side margin portions 114 and 115 are formed, cutting the laminated internal electrodes 121 and 122 to expose the fifth and sixth surfaces 5 and 6 of the body 110 to prevent a step difference caused by the internal electrodes 121 and 122, and laminating a single dielectric layer 111 or two or more dielectric layers 111 in a third direction on both end-surfaces of the capacitance forming portion Ac in the third direction.

The first side margin portion 114 and the second side margin portion 115 may not include the internal electrodes 121 and 122 and may include the same material as that of the dielectric layer 111. That is, the first side margin portion 114 and the second side margin portion 115 may include a ceramic material, for example, a barium titanate ($BaTiO_3$) ceramic material.

In this case, the content of zirconium (Zr) included in the first side margin portion 114 and the second side margin portion 115 may be an input content due to zirconia beads having undergone two stages of milling to be described later. However, an example embodiment thereof is not limited thereto, and the content may be by adding an additive including a zirconium (Zr) element.

The width wm of the first and second side margin portions 114 and 115 may not need to be limited to any particular example.

However, to easily obtain miniaturization and high capacitance of the multilayer electronic component 100, the width wm of the first and second side margin portions 114 and 115 may be 100 µm or less, and preferably 30 µm or less, and more preferably 20 µm or less in ultra-small products.

Here, the width wm of the side margin portions 114 and 115 may refer to the size of the side margin portions 114 and 115 in the third direction. Also, the width wm of the side margin portions 114 and 115 may refer to the average width wm of the side margin portions 114 and 115 and the average size of the side margin portions 114 and 115 in the third direction.

The average thickness of the side margin portion 114 and 115 may be measured by scanning a cross-section of the body 110 in the third direction using a scanning electron microscope (SEM) with a magnification of 10,000×. More specifically, an average value may be measured from the thicknesses of the cover portion at 30 points spaced apart by an equal distance in the first direction in the scanned image. Other methods and/or tools appreciated by one of ordinary skill in the art, even if not described in the present disclosure, may also be used.

In an example embodiment, the multilayer electronic component 100 may have two external electrodes 131 and 132, but the number or shape of the external electrodes 131 and 132 may be varied depending on the forms of the internal electrode 121 and 122 or other purposes.

The external electrodes 131 and 132 may be disposed on the body 110 and may be connected to the internal electrodes 121 and 122.

More specifically, the external electrodes 131 and 132 may be disposed on the third and fourth surfaces 3 and 4 of the body 110, respectively, and may include first and second external electrodes 131 and 132 connected to the first and second internal electrodes 121 and 122, respectively. That is, the first external electrode 131 may be disposed on the third surface 3 of the body and may be connected to the first internal electrode 121, and the second external electrode 132 may be disposed on the fourth surface 4 of the body and may be connected to the second internal electrode 122.

The external electrodes 131 and 132 may be formed of any material having electrical conductivity, such as metal, and a specific material may be determined in consideration of electrical properties and structural stability, and the external electrodes 131 and 132 may have a multilayer structure.

For example, the external electrodes 131 and 132 may include an electrode layer disposed on the body 110 and a plating layer disposed on the electrode layer.

As a more specific example of the electrode layer, the electrode layer may be a fired electrode including conductive metal and glass or a resin-based electrode including conductive metal and resin.

Also, the electrode layer may have a form in which a plastic electrode and a resin-based electrode may be formed in order on the body 110.

Also, the electrode layer may be formed by transferring a sheet including a conductive metal onto the body 110 or by transferring a sheet including a conductive metal onto a fired electrode.

The conductive metal used in the electrode layer is not limited to any particular example as long as a material which may be electrically connected to the internal electrodes 121 and 122 to form capacitance is used, and the conductive metal may include, for example, one or more selected from a group consisting of nickel (Ni), copper (Cu), palladium (Pd), silver (Ag), gold (Au), platinum (Pt), tin (Sn), tungsten (W), titanium (Ti), and alloys thereof. The electrode layers 131a and 132a may be formed by applying a conductive paste prepared by adding glass frit to the conductive metal powder and firing the paste.

The plating layers 131b and 132b may improve mounting properties.

The type of the plating layers 131b and 132b is not limited to any particular example, and may be a single plating layer including at least one of nickel (Ni), tin (Sn), palladium (Pd), and alloys thereof, or may include a plurality of layers.

For a more specific example of the plating layers 131b and 132b, the plating layers 131b and 132b may be a Ni plating layer or a Sn plating layer, and may have a form in which a Ni plating layer and a Sn plating layer are formed in order on the electrode layers 131a and 132a, or a form in which a Sn plating layer, a Ni plating layer, and a Sn plating layer are formed in order. Also, the plating layers 131b and 132b may include a plurality of Ni plating layers and/or a plurality of Sn plating layers.

Hereinafter, an example embodiment of the present disclosure will be described in greater detail.

To disperse the slurry of dielectric particles included in the dielectric slurry used for multilayer electronic components, dispersion may be carried out using zirconia beads as a medium, the specific surface area and grain growth may be improved by dissolving aggregation of the dielectric particles by dispersion. When the particle size of the dielectric particles included in the dielectric slurry is non-uniform, scattering of the dielectric grains may occur during firing, and the size of the dielectric grains may become non-uniform, which may cause a short circuit of the multilayer electronic component or a decrease in breakdown voltage (BDV).

More specifically, when preparing dielectric powder, a drying process may be involved. In this case, a phenomenon in which necking occurs between dielectric particles, that is, drying agglomeration may occur. Dispersion may be carried out using zirconia beads to address the dry agglomeration of dielectric powder and to secure the target specific surface area, which may cause, however, side effects such as non-uniform particle size distribution of dielectric particles in dielectric slurry and increased distribution of dielectric grains after firing.

Also, due to abrasion of zirconia beads, zirconium (Zr) components may flow into the dielectric slurry in the form of impurities, which slows down grain boundary mobility during dielectric firing, and cause a side effect of preventing grain growth. Firing may be controlled when the incoming zirconium (Zr) component is constant, but since the amount of wear of the zirconia beads in the dispersion equipment is not constant, dispersion of dielectric grains may occur during the firing process. Further, as the dispersion time increases, the inflow of zirconium (Zr) may increase, and side effects may become more severe. Accordingly, it may be important to control the inflow of zirconium (Zr) impurities.

Accordingly, in the example embodiment, by reducing the inflow of zirconium (Zr) impurities, uniform and improved distribution of the size distribution of dielectric particles in the dielectric slurry and a size of dielectric grains after firing, improving thereby dielectric capacitance and addressing breakdown voltage due to short circuit and electric field concentration.

A general dispersion method may be of obtaining a target specific surface area BET by weighing and adding dielectric powder, a solvent, and a dispersing agent, and dispersing at the same circumferential speed for a predetermined period of time using zirconia beads. However, in this case, it may not be easy to control the inflow of zirconium (Zr) impurities, and as the dispersion time increases, the inflow content of impurities may increase.

Accordingly, in an example embodiment, the process of dispersing the dielectric slurry, which is a raw material of the dielectric layer, may be divided into two steps.

First, a soft milling step of removing agglomerations generated between dielectric particles and separating weak bonds at a relatively slow peripheral speed may be performed for a predetermined period of time. During the soft milling step, there may be no or an extremely low content of impurities due to the slow milling speed.

Thereafter, a hard milling step of uniformly forming the size of the dielectric particles by controlling the specific surface area BET of the dielectric particles by dispersing at a peripheral speed faster than that of soft milling may be performed for a predetermined period of time. By performing the hard milling step, the process time to reach the specific surface area BET of the target dielectric particle may be reduced, thereby reducing the inflow of impurities.

By dividing the milling step into two steps, the process time to reach the specific surface area BET of the target dielectric particle may be reduced, and the inflow of zirconium (Zr) impurities may be reduced, thereby easily controlling the sintering.

In the multilayer electronic component 100, which is an example embodiment, manufactured by performing two-step milling, a ratio of the average content of zirconium (Zr) included in the capacitance forming portion Ac to the average content of zirconium (Zr) included in the cover portion 112 and 113 may satisfy 0.55 or more and 1.00 or less, and the average content of zirconium (Zr) included in the capacitance forming portion Ac may satisfy 1073 ppm or more and 1950 ppm or less.

As the average content of zirconium (Zr) included in the capacitance forming portion Ac satisfies 1073 ppm or more and 1950 ppm or less, the grain growth of dielectric grains may be controlled and dielectric grains having a fine and uniform size may be formed, such that reliability may be improved.

When the average content of zirconium (Zr) included in the capacitance forming portion Ac is less than 1073 ppm, it may be difficult to implement sufficient dielectric capacitance due to the small size of dielectric grains. When the average content of zirconium (Zr) included in the capacitance forming portion Ac exceeds 1950 ppm, the excessive content of zirconium may lower sintering power of dielectric particles, such that it may be difficult to secure sufficient dielectric capacitance. When the firing temperature is increased to secure sufficient dielectric capacitance, side effects such as agglomeration of internal electrodes may occur.

Here, the average content of zirconium (Zr) included in the capacitance forming portion Ac may be the result of not adding an additive including a zirconium (Zr) element. That is, the average content may correspond to the content of impurities from zirconia beads.

In the case of adding zirconium additives, the amount of impurities flowing by zirconia beads may be excessive to manufacture dielectric particles having a fine and uniform size. Alternatively, when the zirconium content is controlled by adjusting the amount of impurities flowing into the zirconia beads, it may be difficult to manufacture dielectric particles having a fine and uniform size.

The method of measuring the average content of zirconium included in the capacitance forming portion Ac may be as below, may be the same as the method of measuring the average content of zirconium included in the cover portion 112 and 113 or the side margin portion 114 and 115. Other methods and/or tools appreciated by one of ordinary skill in the art, even if not described in the present disclosure, may also be used.

An example of a method of measuring the content of each element in a dielectric layer will be described. In the case of a non-destructive method, the components in the dielectric grains may be analyzed using TEM-EDS and/or STEM-EDS in the center of the chip. A sliced analysis sample may be prepared in the region including the dielectric layer among the cross-sections of the sintered body using a focused ion beam (FIB) device. Also, the damaged layer on the surface of the thinned sample may be removed using Ar ion milling, and mapping and quantitative analysis of each component may be performed in the image obtained using STEM-EDS. In this case, the quantitative analysis graph of each component may be obtained by mass fraction (wt %) of each element, which may be represented in terms of mole fraction (mol %).

Also, in the case of the destructive method, the multilayer capacitor may be pulverized, the internal electrode may be removed, the dielectric layer may be selected, and components of the dielectric layer selected as above may be analyzed using a device such as an inductively coupled plasma spectrometer (ICP-OES) or an inductively coupled plasma mass spectrometer (ICP-MS). In this case, the content of each component may be expressed in ppm.

Also, by controlling the content of zirconium, the average size of the dielectric grains included in the central region a1 of the capacitance forming portion Ac may be 200 nm or more and 300 nm or less, and the standard deviation for the size of the dielectric grains may be 100 nm or more and 130 nm or less.

Dielectric particles of fine and uniform size may be manufactured by going through a two-step milling process, and by controlling the sintering properties by zirconium, fine and uniform dielectric grains having an average size of 200 nm or more and 300 nm or less and a standard deviation of 100 nm or more and 130 nm or less may be formed.

As the average size of dielectric grains satisfies 200 nm or more and 300 nm or less, dielectric capacitance may be improved, and the standard deviation of the size satisfies 100 nm or more and 130 nm or less, breakdown voltage and reliability may be improved, and properties control may be easily performed.

When the average size of the dielectric grains is less than 200 nm, it may be difficult to achieve the target dielectric properties or sintering may not be performed. When the average size of the dielectric grains exceeds 300 nm, breakdown voltage or reliability may decrease.

The lower limit of the standard deviation for the size of dielectric grains is not limited to any particular example, and the smaller the size, the better the dispersion. However, it may be difficult to control the size in practice, such that the lower limit may be limited to 100 nm. When the standard deviation of the size of the dielectric grains exceeds 130 nm, the size deviation between the dielectric grains may increase, such that a breakdown voltage due to electric field concentration may occur or a dissipation factor DF may increase.

The central region a1 of the capacitance forming portion Ac may refer to a region of a size of 4 μm×4 μm disposed in the center of the first and third directions based on the cross-section of the body 110 in the first and third directions at the ½ point in the second direction, but an example embodiment thereof is not limited thereto.

The size of the dielectric grains may refer to an average value of a minimum linear line size and a maximum linear line size passing through the central point of the dielectric grains.

Meanwhile, the average size and standard deviation of dielectric grains may be measured values of the size of existing dielectric grains when observed using a scanning electron microscope (SEM). Other methods and/or tools appreciated by one of ordinary skill in the art, even if not described in the present disclosure, may also be used.

Referring to Equation 1 below, the standard deviation of the size of dielectric grains may be obtained by summing the squared deviations, which indicates the value obtained by subtracting the average size from the measured size of dielectric grains, and obtaining the square root of the variance, which indicates the sum divided by the value obtained by subtracting 1 from the number of measured dielectric grains.

The standard deviation indicates the degree to which the distribution of values is uniform and even, and the smaller the size, the more uniformly sized the grains may be.

$$s_x = \sqrt{\frac{\sum (x_i - \bar{x})^2}{n-1}}$$ [Equation 1]

In an example embodiment, the average size of dielectric grains included in the region a3 adjacent to the cover portions 112 and 113 of the capacitance forming portion Ac may be 130 nm or more and 150 nm or less.

In this case, the standard deviation of the size of dielectric grains included in the region a3 adjacent to the cover portions 112 and 113 of the capacitance forming portion Ac may be 70 nm or more and 90 nm or less.

Here, the region a3 adjacent to the cover portions 112 and 113 of the capacitance forming portion Ac may refer to a region including the dielectric layer 111 adjacent to the internal electrodes 121 and 122 disposed on the outermost side in the first direction of the capacitance forming portion Ac.

More specifically, the region a3 adjacent to the upper cover portion 112 of the capacitance forming portion Ac may refer to a region including a dielectric layer 111 adjacent to the internal electrodes 121 and 122 disposed on the outermost upper part in the first direction, and a region adjacent to the lower cover portion 113 of the capacitance forming portion Ac may refer to a region including the dielectric layer 111 adjacent to the internal electrodes 121 and 122 disposed in the outermost lower portion in the first direction.

In an example embodiment, the region a3 adjacent to the cover portions 112 and 113 of the capacitance forming portion Ac may be a region having a size of 4 μm×2 μm (third direction×first direction) disposed from the center in the third direction to the end in the first direction based on a cross-section of the body 110 in the first and third directions at the ½ point in the second direction.

In FIG. 7, only the region a3 adjacent to the upper cover portion (112) is illustrated, but the region adjacent to the lower cover portion (113) may also refer to the same region as described above, that is, a region symmetric with respect to a linear line in the third direction passing through the center of the capacitance forming portion Ac.

The average size and standard deviation of dielectric grains may be values obtained by measuring the size of existing dielectric grains when observed using a scanning electron microscope (SEM).

When the average size of dielectric grains included in the region a3 adjacent to the cover portion 112 and 113 of the capacitance forming portion Ac is 130 nm or more and 150 nm or less, the number of pores may be low and density may be improved, such that external moisture penetration may be effectively prevented. Accordingly, moisture resistance reliability may be improved, and durability against external impact may be excellent.

Also, when the standard deviation for the size is 70 nm or more and 90 nm or less, breakdown voltage and reliability may be improved, and properties control may be easily performed.

The lower limit of the standard deviation for the size of dielectric grains not limited to any particular example, and it may be desirable that the dispersion may be improved as the size is smaller, but it may be difficult to control the size in practice, such that the lower limit may be limited to 70 nm. When the standard deviation of the size of the dielectric grains exceeds 90 nm, the size deviation between the dielectric grains may increase, a breakdown voltage due to electric field concentration may occur or a dissipation factor DF may increase.

The standard deviation of the average size and size of dielectric grains included in the region a3 adjacent to the cover portion 112 and 113 of the capacitance forming portion Ac may be appropriately adjusted according to properties to be realized by controlling the process conditions of soft milling and hard milling among the two-step milling process for particle size distribution of dielectric slurry.

However, an example embodiment thereof is not limited thereto, and since the average content of zirconium included in the cover portions 112 and 113 described later is higher than the average content of zirconium included in the capacitance forming portion Ac, the grain growth of dielectric grains disposed in regions adjacent to the cover portions 112 and 113 of the capacitance forming portion Ac may be affected.

The same material as that of the dielectric layer included in the capacitance forming portion Ac may be used for the dielectric layer included in the cover portions 112 and 113, but the manufacturing processes may be different. For example, when dispersing the dielectric slurry, a two-step milling process may not be performed, but a dispersion process in which the general same peripheral speed is carried out in one step for a predetermined period of time may be performed.

That is because it may be sufficient to improve the particle size distribution of dielectric slurry in the capacitance forming portion Ac contributing to dielectric capacitance, and it may be unnecessary to improve the particle size distribution of dielectric slurry in cover portions 112 and 113 which may not contribute to dielectric capacitance.

Accordingly, the average content of zirconium (Zr) included in the cover portion 112 and 113 may be higher than the average content of zirconium Ac included in the capacitance forming portion Ac, and due to this process, a ratio of the average content of zirconium (Zr) included in the capacitance forming portion Ac to the average content of zirconium (Zr) included in the cover portions 112 and 113 may satisfy 0.55 or more and 1.00 or less.

More specifically, the average content of zirconium (Zr) included in the cover portions 112 and 113 may be greater than 1950 ppm.

The average content of zirconium (Zr) included in the cover portions 112 and 113 may preferably be less than 2910 ppm, which allows sintering of the dielectric layer, but an example embodiment thereof is not limited thereto, and a content of zirconium (Zr) allowing sintering of the dielectric may be sufficient.

Since the average content of zirconium (Zr) included in the cover portion 112 and 113 is relatively high, grain growth of dielectric grains may be promoted, and the average size of the dielectric grains included in the cover portion 112 and 113 may be larger than the average size of dielectric grains included in the central region (a1) of the capacitance forming portion Ac.

Here, the size of the dielectric grains included in the cover portion 112 and 113 may be a value obtained by measuring the size of dielectric grains present in region c1 having a size of 4 μm×2 μm (third direction×first direction) in the center of the first and third directions based on a cross-section of the cover portions 112 and 113 in the first and third directions at ½ points in the second direction.

Although only the region c1 of the upper cover portion 112 is illustrated in FIG. 7, the size of dielectric grains may also be measured in the same region of the lower cover portion 113 as described above.

The average size and standard deviation of dielectric grains may be values obtained by measuring the size of dielectric grains present when observed using a scanning electron microscope (SEM).

As described above, since the cover portions 112 and 113 may also protect the capacitance forming portion Ac or the internal electrodes 121 and 122, by forming the average size of the dielectric grains included in the cover portion 112 and 113 larger than the dielectric grains included in the central region (a1) of the capacitance forming portion Ac, mechanical strength may be increased, and delamination or cracks may be prevented even from external impact.

In an example embodiment, the average size of dielectric grains included in the region (a4) adjacent to the side margin portions 114 and 115 of the capacitance forming portion Ac may be 200 nm or more and 250 nm or less.

In this case, the standard deviation of the size of dielectric grains included in the region (a4) adjacent to the side margin portions 114 and 115 of the capacitance forming portion Ac may be 100 nm or more and 115 nm or less.

Here, the region (a4) adjacent to the side margin portions 114 and 115 of the capacitance forming portion Ac may refer to a region including the dielectric layer 111 disposed on the outermost side of the capacitance forming portion Ac in the third direction.

More specifically, a region adjacent to the first side margin portion 114 of the capacitance forming portion Ac may refer to a region including the left end of the dielectric layer 111 in the third direction, and a region adjacent to the second side margin portion 115 of the capacitance forming portion Ac may refer to a region including the right end of the dielectric layer 111 in the third direction.

The region (a4) adjacent to the side margin portions 114 and 115 in the capacitance forming portion Ac may refer to a region having a size of 2 μm×4 μm (third direction×first direction) disposed from the center in the first direction to the end in the third direction based on a cross-section of the body 110 in the first and third directions at the ½ point in the second direction.

In FIG. 7, only the region (a4) adjacent to the second side margin portion 115 is illustrated, but the region adjacent to the first side margin portion 114 may also be the same region as described above, that is, a region symmetrical based on a linear line in the first direction passing through the center of the capacitance forming portion Ac.

The average size and standard deviation of dielectric grains may be values obtained by measuring the size of existing dielectric grains when observed using a scanning electron microscope (SEM).

When the average size of dielectric grains included in the region (a4) adjacent to the side margin portions 114 and 115 of the capacitance forming portion Ac is 200 nm or more and 250 nm or less, it may be easy to secure sufficient dielectric capacitance.

Also, when the standard deviation of the size is greater than or equal to 100 nm and less than or equal to 115 nm, the breakdown voltage and reliability may be improved, and properties control may be easily performed.

When the average size of dielectric grains is less than 200 nm, it may be difficult to implement sufficient dielectric capacitance, and when the average size of dielectric grains exceeds 250 nm, there is a concern that breakdown voltage and reliability may be lowered due to electric field concentration.

The lower limit of the standard deviation for the size of dielectric grains is not limited to any particular example, and the smaller the size, the better the dispersion, but it may be difficult to control the size, such that the lower limit may be limited to 100 nm. When the standard deviation of the size of the dielectric grains exceeds 115 nm, the size deviation between the dielectric grains may increase, a breakdown voltage due to electric field concentration may occur or a dissipation factor DF may increase.

The average size and standard deviation of the sizes of dielectric grains included in the region (a4) adjacent to the side margin portions 114 and 115 of the capacitance forming portion Ac may be a result of affecting grain growth of dielectric grains disposed in regions adjacent to the side margin portions 114 and 115 of the capacitance forming portion Ac, since the average content of zirconium included in the side margin portions 114 and 115 is higher than the average content of zirconium included in the capacitance forming portion Ac.

The same material as the dielectric layer 111 included in the capacitance forming portion Ac may be used for the dielectric layer 111 included in the side margin portions 114 and 115, but the manufacturing processes may be different. For example, when dispersing the dielectric slurry, a two-step milling process may not be performed, and a general one-step dispersing process may be performed at the same peripheral speed for a predetermined period of time.

This is because it may be sufficient to improve the particle size distribution of dielectric slurry in the capacitance forming portion Ac contributing to dielectric capacitance, and it may be unnecessary to improve the particle size distribution of the dielectric slurry in the side margin portions 114 and 115 which may not contribute to dielectric capacitance.

Thus, the average content of zirconium (Zr) included in the side margin portions 114 and 115 may be higher than the average content of zirconium Ac included in the capacitance forming portion Ac.

More specifically, the average content of zirconium (Zr) included in the side margin portions 114 and 115 may be greater than 1950 ppm.

The average content of zirconium (Zr) included in the side margin portions 114 and 115 may preferably be less than 2910 ppm, which allows sintering of the dielectric layer, but an example embodiment thereof is not limited thereto, and a content of zirconium (Zr) allowing sintering of the dielectric may be sufficient.

Since the average content of zirconium (Zr) included in the side margin portions 114 and 115 is relatively high, grain growth of dielectric grains may be promoted, and the average size of dielectric grains included in the side margin portions 114 and 115 may be greater than the average size of dielectric grains included in the central region a1 of the capacitance forming portion Ac.

Here, the size of the dielectric grains included in the side margin portions 114 and 115 may be a value obtained by measuring the size of dielectric grains present in a region with a size of 2 μm×4 μm (third direction×first direction) in the center of the first and third directions based on a cross-section of the side margin portions 114 and 115 in the first and third directions at ½ points in the second direction.

The average size and standard deviation of dielectric grains may be values obtained by measuring the size of dielectric grains when observed using a scanning electron microscope (SEM).

In an example embodiment, the average size of dielectric grains included in the region a2 simultaneously adjacent to the cover portion 112 and 113 and the side margin portion 114 and 115 of the capacitance forming portion Ac may be greater than or equal to 160 nm and less than or equal to 180 nm.

In this case, the standard deviation of the size of dielectric grains included in the region a2 simultaneously adjacent to the cover portion 112 and 113 and the side margin portion 114 and 115 of the capacitance forming portion Ac may be greater than or equal to 80 nm and less than or equal to 90 nm.

Here, the region a2 simultaneously adjacent to the cover portion 112 and 113 and the side margin portion 114 and 115 of the capacitance forming portion Ac may refer to a region including the dielectric layer 111 disposed on the ends of the capacitance forming portion Ac in the first and third directions, that is, a region disposed at the corner of the capacitance forming portion Ac.

More specifically, the region a2 adjacent to the upper cover portion 112 and the second side margin portion 115 of the capacitance forming portion Ac may refer to a right upper portion, which is a region including the right end in the third direction of the dielectric layer 111 adjacent to the internal electrodes 121 and 122 disposed in the outermost upper portion in the first direction.

Also, only the adjacent region a2 in contact with the upper cover portion 112 and the second side margin portion 115 is illustrated in FIG. 7, but an adjacent region in contact with the cover portion and the side margin portion at the same time may include a region corresponding to the position symmetrical to the region a2. More specifically, the upper left portion simultaneously in contact with the upper cover portion 112 and the first side margin portion 114, the upper left portion which is an adjacent region simultaneously in contact with the lower cover portion 113 and the first side margin portion 114, and the right lower portion which is an adjacent region simultaneously in contact with the lower cover portion 113 and the second side margin portion 115 may be included.

The region a2 simultaneously adjacent to the cover portion 112 and 113 and the side margin portion 114 and 115 of the capacitance forming portion Ac may refer to a region Having a size of 2 μm×2 μm (third direction×first direction) disposed on the ends of the first and third directions based on a cross-section of the body 110 in the first and third directions at the ½ point in the second direction.

When the average size of dielectric grains included in the region a2 simultaneously adjacent to the cover portion 112 and 113 and the side margin portion 114 and 115 of the capacitance forming portion Ac is 160 nm or more and 180 nm or less, the number of pores may be small and the density may be improved, such that penetration of external moisture may be effectively prevented. Accordingly, moisture resistance reliability may be improved, and mechanical strength may be improved, such that resistance against external impact may be excellent.

Also, when the standard deviation of the size of dielectric grains is 80 nm or more and 90 nm or less, breakdown voltage and reliability may be improved, and properties control may be easily performed.

The lower limit of the standard deviation for the size of dielectric grains may not be limited to any particular example, and the smaller the size, the better the dispersion, but it may be difficult to control the size in practice, such that the lower limit may be limited to 80 nm. When the standard deviation of the size of the dielectric grains exceeds 90 nm, the size deviation between the dielectric grains may increase, such that a breakdown voltage due to electric field concentration may occur or a dissipation factor DF may increase.

The average size and standard deviation of the sizes of dielectric grains included in the region (a1) simultaneously adjacent to the cover portion 112 and 113 and the side margin portion 114 and 115 of the capacitance forming portion Ac may be appropriately adjusted according to properties by controlling the process conditions of soft milling and hard milling among the two-step milling process for particle size distribution of dielectric slurry.

However, an example embodiment thereof is not limited thereto, since the average content of zirconium included in the cover portion 112 and 113 and the side margin portion 114 and 115 is higher than the average content of zirconium included in the capacitance forming portion Ac, grain growth of dielectric grains disposed in the region (a1) adjacent to the cover portion 112 and 113 and the side margin portion 114 and 115 of the capacitance forming portion Ac may be affected.

Although the example embodiments have been described in detail above, the example embodiment is not limited by the above-described embodiments and the accompanying drawings, but is limited by the appended claims. Therefore, various forms of substitution, modification, and change may be made by those skilled in the art within the scope of the technical spirit of the present disclosure described in the claims, which also falls within the scope of the present disclosure.

Hereinafter, the example embodiment will be described in greater detail through experimental examples, but the scope of the present disclosure is not limited to the experimental examples.

Embodiment

Table 1 below lists data obtained by measuring the size of grains according to the added content of zirconium (Zr) due to zirconia beads, and no additional zirconium additive was added.

The content of zirconium (Zr) included in the cover portion of Test Examples 1 to 7 was controlled to be 1950 ppm, and only the content of zirconium (Zr) included in the capacitance forming portion was varied.

The zirconium (Zr) content included in the capacitance forming portion is a value measured in dielectric slurry, and the zirconium (Zr) content did not change before and after firing.

The ratio of capacitance forming portion/cover portion zirconium (Zr) may refer to a ratio of the content of zirconium (Zr) included in the capacitance forming portion to the content of zirconium (Zr) included in the cover portion.

The size of dielectric grains in the central region (a1) of the capacitance forming portion may be the size of dielectric grains measured in the 4 μm×4 μm range of the central portion based on the cross section of the body in the first and third directions at the ½ point in the second direction, and the average size and standard deviation were calculated and listed in Table 1. Based on the ± sign, the size listed before is the average size, and the size listed after is the standard deviation size.

TABLE 1

| Test example | Zirconium (Zr) content of the capacitance forming portion (ppm) | Zirconium (Zr) content ratio of (capacitance forming portion/cover portion) | Size of dielectric grains in capacitance forming portion |
|---|---|---|---|
| 1 | 2910 | 1.49 | Unsintered |
| 2 | 2470 | 1.27 | Unsintered |
| 3 | 1950 | 1.00 | 300 nm ± 130 nm |
| 4 | 1490 | 0.76 | 260 nm ± 110 nm |
| 5 | 1205 | 0.62 | 240 nm ± 110 nm |
| 6 | 1073 | 0.55 | 220 nm ± 100 nm |
| 7 | 900 | 0.46 | 190 nm ± 95 nm |

In the case of test example 1 and test example 2, the contents of zirconium (Zr) included in the capacitance forming portion were 2910 ppm and 2470 ppm, respectively, and zirconium was excessively added, such that sinterability was deteriorate by the undissolved zirconium, and accordingly, grain growth of dielectric grains did not occur, and it was impossible to secure capacitance. Also, in test example 7, the content of zirconium included in the capacitance forming portion was 900 ppm, and the inflow content of zirconium was small, such that the size of dielectric grains was formed to be less than 200 nm, and sufficient dielectric capacitance was not implemented.

In test example 3 to test example 6, the contents of zirconium (Zr) included in the capacitance forming portion were 1950 ppm, 1490 ppm, 1205 ppm and 1073 ppm, respectively, and the dielectric grains average size satisfied 200 nm or more and 300 nm or less, and the standard deviation satisfied 100 nm or more and 130 nm or less, such that dielectric capacitance properties were improved, and breakdown voltage and reliability were also improved.

Table 2 below relates to an accelerated life test (HALT), moisture resistance reliability evaluation, and a step IR evaluation performed on test example 2 and test example 3 of table 1 above.

For each test example, 400 chips were mounted and evaluated, and the number of chips evaluated as defective was counted for each test.

The highly accelerated life test (HALT) was conducted for 3 hours at a temperature condition of 105° C., and the insulation resistance (IR) value fallen below $10^7$ was evaluated as defective.

Moisture-resistant reliability was performed for 2 hours at a temperature condition of 85° C., a relative humidity condition of 85%, and a voltage condition of 1.2 Vr, and the insulation resistance (IR) value fallen below $10^7$ was evaluated as defective.

The step IR evaluation was performed under different voltage conditions every 2 hours, and when 4V, 6V, 8V, and 10V were applied for 2 hours, the number of failed chips was counted and evaluated as defective if the above criteria were met.

In this case, chips evaluated as defective for each section were cumulatively marked.

TABLE 2

| Test example | HALT | Moisture resistance reliability | Step IR (Ω) | | | |
|---|---|---|---|---|---|---|
| | | | 2 hrs@4 V | 4 hrs@6 V | 6 hrs @8 V | 8 hrs @10 V |
| 2 | 3/40 | 5/40 | 0/40 | 2/40 | 4/40 | 10/40 |
| 3 | 0/40 | 0/40 | 0/40 | 0/40 | 1/40 | 5/40 |

In test example 2, among 40 sample chips, 3 chips were evaluated as defective in the HALT evaluation, and 5 chips were evaluated as defective in the moisture resistance reliability evaluation. Also, in the step IR evaluation, no defects occurred under the 4V voltage condition, but two defective chips occurred under the 6V voltage condition (the accumulated defective chips were 2), 2 defective chips occurred under the 8V voltage condition (the accumulated defective chips were 4), and 6 defective chips occurred under the 10V voltage condition (the accumulated defective chips were 10).

In test example 3, no defects occurred in the HALT evaluation and the moisture resistance reliability evaluation among the entirety of 40 sample chips. Also, in the step IR evaluation, no defects occurred under the 4V and 6V voltage conditions, 1 defective chip occurred under the 8V voltage condition, and 4 defective chips occurred under the 10V voltage condition (the accumulated defective chips were 5).

According to the evaluation result of test example 3, which is an example embodiment, it is confirmed that, when the content of impurities flowing in from the zirconia beads is controlled through a two-step milling process, fine and uniformly sized dielectric grains may be formed, dielectric capacitance may be improved, and electrical properties such as breakdown voltage and moisture resistance reliability may be improved.

According to the aforementioned example embodiments, the size distribution of dielectric grains may be improved.

Also, the dielectric capacitance of multilayer electronic components may be improved and the decrease in breakdown voltage (BDV) may be prevented.

While the example embodiments have been illustrated and described above, it will be configured as apparent to those skilled in the art that modifications and variations could be made without departing from the scope of the present disclosure as defined by the appended claims.

What is claimed is:

1. A multilayer electronic component, comprising:
 a body including a capacitance forming portion including a dielectric layer and internal electrodes alternately disposed with the dielectric layer in a first direction, and a cover portion disposed on each of both end surfaces of the capacitance forming portion in the first direction; and
 an external electrode disposed on the body,
 wherein a ratio of an average content of zirconium (Zr) included in the capacitance forming portion to an average content of zirconium (Zr) included in the cover portion satisfies 0.55 or more and 1.00 or less,
 wherein an average content of zirconium (Zr) included in the capacitance forming portion satisfies 1073 ppm or more and 1950 ppm or less, and
 wherein an average size of dielectric grains included in a central region of the capacitance forming portion is 200 nm or more and 300 nm or less, with a standard deviation that is 100 nm or more and 130 nm or less.

2. The multilayer electronic component of claim 1, wherein an average size of dielectric grains included in a region of the capacitance forming portion adjacent to the cover portion is 130 nm or more and 150 nm or less.

3. The multilayer electronic component of claim 2, wherein a standard deviation for the average size of the dielectric grains included in the region of the capacitance forming portion adjacent to the cover portion is 70 nm or more and 90 nm or less.

4. The multilayer electronic component of claim 1, wherein an average content of zirconium (Zr) included in the cover portion is greater than 1950 ppm and less than 2910 ppm.

5. The multilayer electronic component of claim 1, wherein an average size of dielectric grains included in the cover portion is greater than an average size of dielectric grains included in a central region of the capacitance forming portion.

6. The multilayer electronic component of claim 1,
 wherein the body comprises first and second surfaces opposing each other in the first direction, third and fourth surfaces connected to the first and second surfaces and opposing each other in a second direction, and fifth and sixth surfaces connected to the first to fourth surfaces and opposing each other in a third direction, and
 wherein the body further includes a side margin portion disposed on each of the fifth and sixth surfaces of the body.

7. The multilayer electronic component of claim 6, wherein an average size of dielectric grains included in a region of the capacitance forming portion adjacent to the side margin portion is 200 nm or more and 250 nm or less.

8. The multilayer electronic component of claim 7, wherein a standard deviation for the average size of the dielectric grains included in the region of the capacitance forming portion adjacent to the side margin portion is 100 nm or more and 115 nm or less.

9. The multilayer electronic component of claim 6, wherein an average size of dielectric grains included in a region of the capacitance forming portion simultaneously adjacent to the cover portion and the side margin portion is 160 nm or more and 180 nm or less.

10. The multilayer electronic component of claim 9, wherein a standard deviation of the average size of the dielectric grains included in the region of the capacitance forming portion simultaneously adjacent to the cover portion and the side margin portion is 80 nm or more and 90 nm or less.

11. The multilayer electronic component of claim 6, wherein an average content of zirconium (Zr) included in the side margin portion is greater than 1950 ppm and less than 2910 ppm.

12. The multilayer electronic component of claim 6, wherein an average size of dielectric grains included in the side margin portion is greater than an average size of dielectric grains included in the central region of the capacitance forming portion.

13. The multilayer electronic component of claim 6, wherein an average size of the dielectric layer in the first direction is 0.6 μm or less.

14. The multilayer electronic component of claim 6, wherein an average size of at least one of the internal electrodes in the first direction is 0.6 μm or less.

15. The multilayer electronic component of claim 6, wherein an average size of the side margin portion in the third direction is 20 μm or less.

16. The multilayer electronic component of claim 1, wherein an average size of the cover portion in the first direction is 20 μm or less.

17. A method of manufacturing the multilayer electronic component of claim 1, comprising first and second milling dielectric powder with zirconia beads to form dielectric particles, wherein the second milling is performed at a peripheral speed faster than that of the first milling.

18. The method of claim 17, further comprising sintering the milled dielectric particles to form the dielectric layer.

19. The method of claim 17, wherein the dielectric powder is milled with a dispersing agent.

20. The method of claim 19, wherein the dielectric powder is milled with a solvent.

\* \* \* \* \*